Nov. 27, 1951 A. V. LAPISH 2,576,125

AUTOMATIC RECORD CHANGER

Filed April 27, 1946 5 Sheets-Sheet 1

INVENTOR
ARLINGTON V. LAPISH

BY [signature]

ATTORNEY

Nov. 27, 1951 A. V. LAPISH 2,576,125

AUTOMATIC RECORD CHANGER

Filed April 27, 1946 5 Sheets-Sheet 2

INVENTOR
ARLINGTON V. LAPISH

BY [signature]

ATTORNEY

INVENTOR
ARLINGTON V. LAPISH

BY Edwin M. Martin

ATTORNEY

Nov. 27, 1951 A. V. LAPISH 2,576,125

AUTOMATIC RECORD CHANGER

Filed April 27, 1946 5 Sheets-Sheet 4

INVENTOR
ARLINGTON V. LAPISH

BY [signature]

ATTORNEY

INVENTOR
ARLINGTON V. LAPISH

BY [signature]

ATTORNEY

Patented Nov. 27, 1951

2,576,125

UNITED STATES PATENT OFFICE 2,576,125

AUTOMATIC RECORD CHANGER

Arlington Victor Lapish, Fort Wayne, Ind., assignor, by mesne assignments, to Farnsworth Research Corporation, a corporation of Indiana Application April 27, 1946, Serial No. 665,475

3 Claims. (Cl. 274—10)

This invention relates generally to automatic phonographs and more particularly it relates to automatic phonographs of the drop type which are adapted to handle records of different diameters in intermixed relation.

Conventional automatic phonographs of the drop type are provided with three different types of record supporting mechanisms. For example, it is conventional to utilize two diametrically opposite record supports for supporting a stack of records above the turntable. These record supports may consist of rotatable knives or fixed shelves having sliding members for removing records therefrom. Another type of record support consists of a shelf at one side of the turntable which is adapted to cooperate with a spindle having a notched portion for supporting a stack of records above the turntable. Records may be removed from this type of support by means of a mechanism adapted to slide the lowermost record from the supports to the turntable. As is well-known to those skilled in the art, it is not possible to use records of different diameters in intermixed relation with record changers having record supports such as those described in the foregoing, the reason being that it is very difficult to release records to the turntable unless all of the records in the stack are of the same diameter.

A third type of record supporting mechanism comprises a spindle which is centered with respect to the turntable and which is provided with a record supporting and releasing mechanism which is more or less self-contained within the spindle. For example, it is conventional to provide a rotatable record-releasing member which is eccentrically disposed with respect to the remainder of the spindle. By rotating the eccentric member into alignment with the spindle, one record at a time may be released to the turntable. This type of record supporting and releasing mechanism has the disadvantage that it enlarges the centering aperture of the record and this, of course, makes it difficult to insure that the record is centered with reasonable accuracy on the turntable. When records are not centered on the turntable, an audible distortion is produced when the record is played. It is also characteristic of this type of record supporting and releasing mechanism that the stack of records must be supported on a very small area of the lowermost record adjacent its centering aperture. Because of the fact that the complete stack of records may drop onto this limited area of the lowermost record during a record changing cycle, it frequently happens that the record is broken or otherwise mutilated.

Accordingly, it is the principal object of this invention to provide a novel automatic phonograph which is adapted to play automatically records of intermixed diameters, one after the other in succession.

Another object of this invention is to provide in an automatic phonograph a novel change cycle control mechanism which is particularly adapted to operate a record supporting and releasing mechanism which is a composite part of a record centering spindle.

In accordance with this invention, there is provided an automatic phonograph comprising a turntable and a record centering spindle including an enlargeable portion spaced above the turntable for engaging and supporting records. For operating the record engaging portion of the spindle, there is provided a pair of members which are operatively associated with a unitary change cycle cam means which is adapted to so control the spindle that records may be dropped to the turntable one after the other. There is also provided a drive means and a tripping means for engaging the unitary cam with the drive means in order to initiate a record changing cycle.

In accordance with a further feature of this invention, there is provided a change cycle control apparatus for controlling the tone arm and record supporting means comprising a control mechanism, a drive means, a pawl adapted to connect the control mechanism with the drive means and a tripping mechanism responsive to the movement of the tone arm for actuating the pawl and initiating a record changing cycle.

In accordance with still another feature of this invention, there is provided apparatus for controlling the tone arm of an automatic phonograph in such a manner that it may engage with the initial playing groove of either a small record or a large record. This apparatus includes a tone arm control lever for normally moving the tone arm into alignment with the initial playing groove of a large record. In operative association with the tone arm control lever, there is provided a member which is movable automatically for moving the tone arm into engagement with the initial playing groove of a small record. An index finger is operatively associated with the second control member for moving it to an ineffective position when a large record is dropped to the turntable.

A still further feature of this invention provides apparatus whereby the automatic phonograph may be operated either manually or automatically. For supporting a stack of records there is provided a record centering spindle comprising a record supporting portion spaced above the turntable and a movable record releasing portion adjacent the record supporting portion. For effecting a record changing cycle, there is provided a cam means and a linkage connecting the cam means with the record supporting portion for separating the lowermost record during a record changing cycle and supporting the remainder of the stack of records during a record changing cycle. For moving the record releasing portion of the spindle there is provided a second linkage and a means for connecting it with the cam means. A manually operable mechanism disconnects the connecting means from the cam means for permitting manual operation of the phonograph.

For a better understanding of the invention, together with other and further objects thereof, reference is made to the following description, taken in connection with the accompanying drawings, and its scope will be pointed out in the appended claims.

Figure 1:
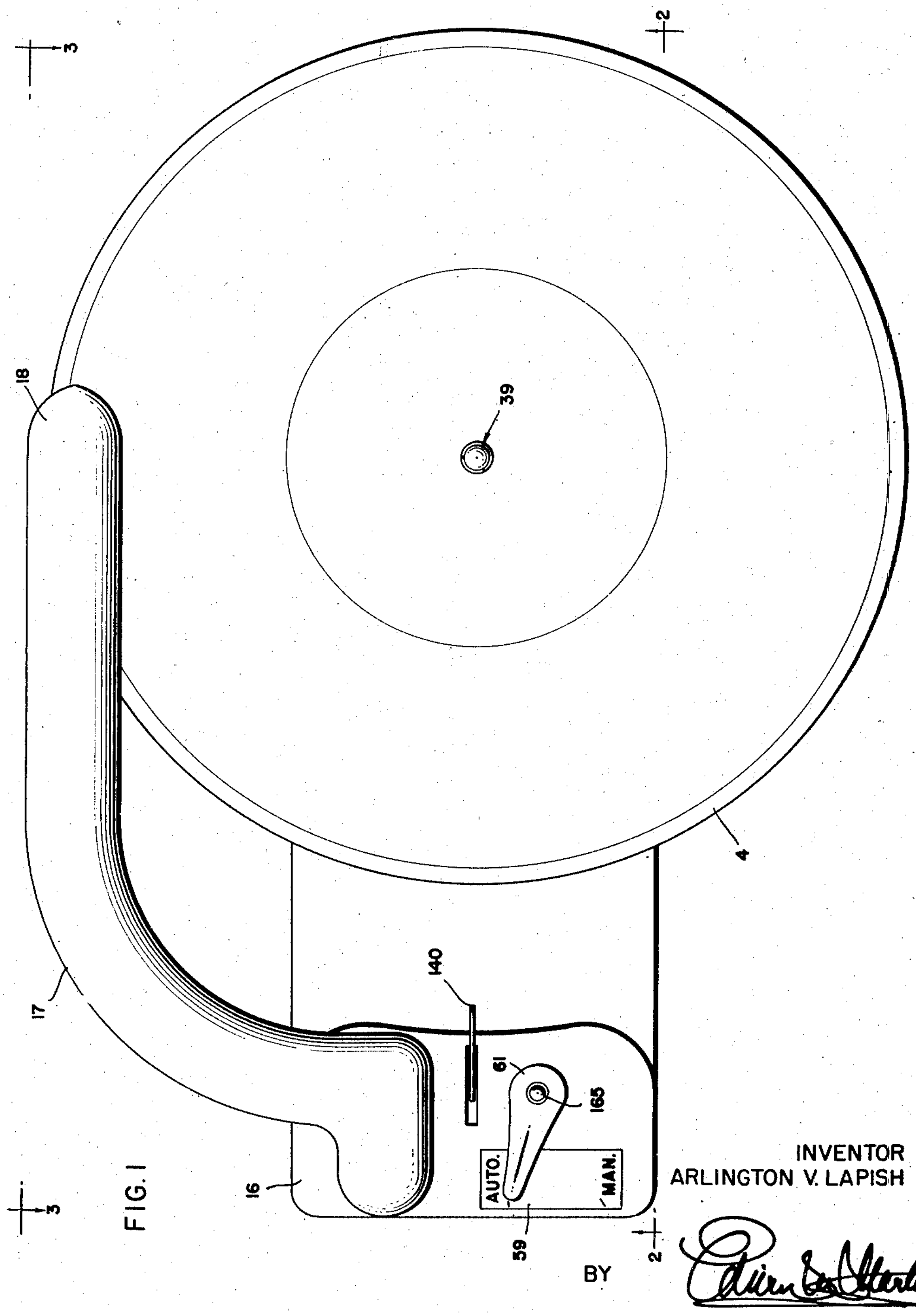
Fig. 1 is a top plan view of a record-changing apparatus with the unplayed records removed from the record-supporting means.

Referring generally to the drawings, there is shown a record-changing apparatus consisting of a base plate 2 for supporting a turntable 3 upon which is positioned for reproduction, the record 4. The turntable 3 is rotated continuously by means of a suitable motor 5 (Fig. 2) secured to the base plate by screws 6. The motor is provided with a drive pulley 7 in frictional engagement with a wheel 8 which in turn is in frictional engagement with the inner periphery of the rim on the turntable 3. The turntable 3 is rotatably mounted at its center upon a tubular shaft 10 (Fig. 6), journaled in the bearing 11, depending from the base plate 2. The ball-bearing 13 provides a rotatable support for the turntable.

Adjacent the turntable there is provided a tone arm 17 pivotally mounted for horizontal and vertical movement on the standard 16 (Fig. 2) secured to the base plate 2. Tone arm 17 has a reproducer 18 adapted to track the record 4. Referring in detail to Fig. 3, the tone arm 17 is pivotally supported as at 15 to an offset bracket 19 which is fixed to the upper end of a vertical sleeve 20. The sleeve 20 is rotatably mounted in the bearing 21 which is affixed to the standard 16 by means of a set screw 22.

Extending through the sleeve 20 is a tone arm lift pin 23, the lower end thereof being arranged to be moved by one end of a tone arm elevating and lowering lever 30 and an adjustable set screw 31. The lever 30 is pivotally mounted as at 32 to a bracket 33 depending from the base plate 2. Hence, as the lever 30 is pivoted in a counterclockwise direction (Fig. 3), the upper end of the lift pin 23 is moved into engagement with the tone arm 17 to lift it away from the record 4. Conversely, if the lever 30 is pivoted in a clockwise direction, the tone arm is lowered.

Secured to the lower end of the sleeve 20 (Fig. 4) is a bell crank lever 24 having a pair of control arms 25 and 26. At the outer end of the arm 25, there is an upwardly extending pin 27 adapted to be moved by a tone arm control mechanism for swinging the tone arm laterally, as hereinafter described. A fibre washer 29 interposed in frictional engagement between the hub 28 of the bell crank lever 24 and the base plate 2 prevents the reproducer from over-swinging its proper position when being lowered into engagement with the record 4 on the turntable.

Figures 6, 7, 9:
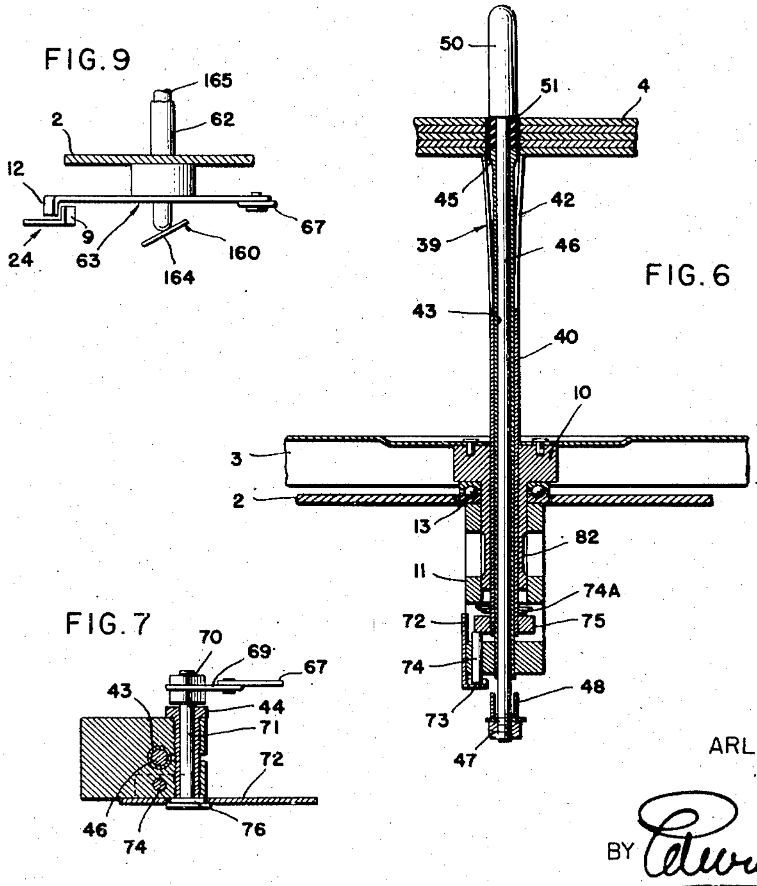
Fig. 6 is a detailed sectional view taken on line 6—6 of Fig. 2, showing the record-supporting and releasing mechanisms.
Fig. 7 is a detailed sectional view taken on line 7—7 of Fig. 3, showing the locking mechanism associated with the record-supporting means.
Fig. 9 is a sectional view taken on line 9—9 of Fig. 5.

Referring to Fig. 6, there is shown in detail, a record centering spindle 39 for supporting records above the turntable 3 together with means for releasing and lowering a record onto the turntable. The spindle 39 comprises an outer record supporting and releasing sleeve 40 having its upper end extending above the turntable and its lower end journaled in the tubular shaft 10. At the extreme lower end of the sleeve 40, there is secured thereto a collar 75 which is adapted to prevent the sleeve 40 from rotating and to permit the vertical movement of the sleeve 40.

Figure 6A:
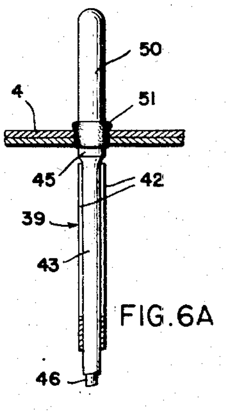
Fig. 6A illustrates a portion of the operating cycle of the mechanism shown in Fig. 6.

The upper end of the sleeve 40 is tri-parted, as at 42, so that it may be expanded to form a flared record supporting and releasing section slightly greater in diameter than the diameter of the record centering aperture of a record. Mounted within the sleeve 40 is a sleeve 43 having its lower end affixed to the bearing 11 by means of a tubular threaded member 44 (Figs. 2 and 7) which extends through a split portion of bearing 11 whereby the split portion may be compressed into firm engagement with sleeve 43. At the upper end of the sleeve 43, there is formed a shoulder 45 projecting above the upper end of the sleeve 40 the thickness of a record and having a diameter slight less than the centering aperture of a record. As the sleeve 40 is moved in an upward direction (Fig. 6) the tri-parted portion 42 thereof is caused to engage the shoulder 45 and expand to a diameter slightly greater than the diameter of the centering apertures of the records 4 to form a seat so that the stack of records may rest thereon. Disposed between the collar 75 and the bearing 11 is a spring 74A which normally urges the sleeve 40 in a downward direction. When the sleeve 40 is released, the spring 74A moves it in a downward direction, whereupon the tri-parted portion 42 assumes its normal diameter thereby permitting records to fall onto the turntable (Fig. 6A).

Extending through the sleeve 43 (Figs. 2, 3, 4 and 6) is a control rod 46 having its lower end adjustably secured as at 47 to a lever 48 which is pivotally mounted to the bearing 11 as at 49. Formed at the upper end of the control rod 46 and spaced the thickness of several records above the shoulder 45 is a head portion 50. Disposed about the control rod 46 between the shoulder 45 and the portion 50, there is arranged an enlargeable resilient record supporting collar 51 having a normal diameter slightly less than the aperture of a record (Fig. 6). Collar 51 may consist of rubber, for example. In operation, as the control rod 46 is moved in a downward direction by lever 48, the enlarged portion 50 thereof compresses the collar 51 (Fig. 6A) and causes it to expand and frictionally grip the inner aperture walls of all but the lowermost record in the stack of records supported by the sleeve 40. It is to be observed that as the collar 51 is expanded, the lowermost record in the stack freely rests on the extremities of portion 42 so that the release of the lowermost record may be effected by the downward movement of the sleeve 40.

For controlling the movement of the sleeve 40 to support and release records, there is provided a control mechanism 60 (Figs. 2, 5 and 7) and a record-change cycle mechanism which will be hereinafter described. The control mechanism 60 comprises a control knob 61 (Fig. 2) which is suitably secured to the upper end of a vertical sleeve 62 journaled in the standard 16. The control knob 61 is adapted to be moved over a scale 59 (Fig. 1) having positions marked "manual" and "automatic." Affixed to the lower end of the sleeve 62, is a bell crank lever 63 (Figs. 2 and 5) having a pair of arms 64 and 65. Pivotally secured by a pin 66 to the arm 65 is one end of a lever 67 having its opposite end pivotally affixed, as at 68, to one end of a lever 69. The opposite end of the lever 69 is secured by nuts 70 to one end of a pivot shaft 71 journaled in the tubular member 44. On the opposite end of the pivot shaft 71 there is formed a bearing surface 76 (Figs. 3 and 7) about which is pivoted a lever 72. The lever 72 has an outwardly turned ear 73 (Fig. 6) which is arranged, when the lever 72 is pivoted in clockwise direction or is lifted, to engage and actuate a vertical pin 74 journaled in the bearing 11. The upper end of the pin 74 is arranged to engage and actuate the collar 75 secured to the lower end of the sleeve 40 thereby to elevate or lower sleeve 40.

The bearing surface 76 is provided with a high and low cam surface 78 and 79 (Fig. 3) respectively. When the control knob 61 is rotated to the "automatic" position, the high cam surface 78 is moved in a counterclockwise direction to engage the flat horizontal wall of the aperture 77 thereby lifting the lever 72 and therewith the ear 73 as shown in Fig. 3. In effect, there is provided an eccentric pivot. Lever 72 is lifted instead of rotated by reason of the fact that the right hand end (Fig. 3) of lever 72 bears on a cam surface which will be described hereinafter. When the lever 72 is lifted, the ear 73 thereof engages and elevates the pin 74 (Fig. 6) which in turn lifts the collar 75 to move the sleeve 40 in an upward direction into engagement with the shoulder 45 to support records in a manner previously described. During a normal record-change cycle operation, the lever 72 is pivoted in a counterclockwise direction about the high cam surface 78 to cause the sleeve 40 to be moved in a downward direction under the influence of spring 74A to release the lowermost record in the stack.

When the control knob 61 is moved to the "manual" position, the shaft 71 is rotated in a clockwise direction and the low point cam surface 79 is positioned in a horizontal plane, whereupon the lever 72 is caused to drop to a non-operative position due to the elongated configuration of the aperture 77. As the lever 72 drops the spring 74A moves the sleeve 40 downwardly to its non-record supporting position. With the sleeve 40 in this position, the records on the turntable can be removed or the phonograph apparatus can be played manually. This is true because, when the lever 72 is dropped, the pin 74 also drops, whereupon when the lever 72 is pivoted about the low cam surface 79, pin 74 does not move upwardly sufficiently to engage the collar 75 and actuate the sleeve 40.

Figure 4:
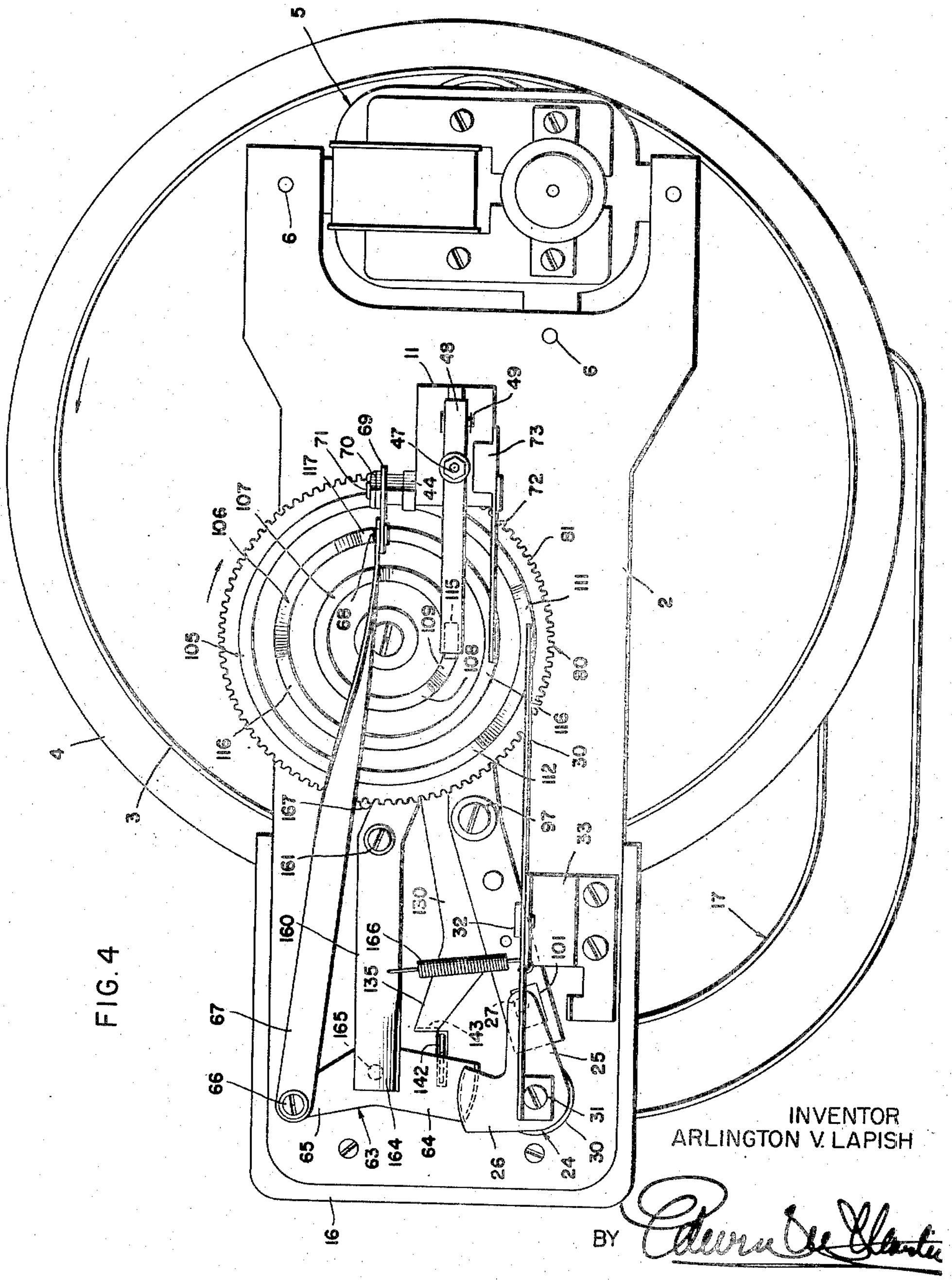
Fig. 4 is a bottom plan view of the apparatus.
Figure 5:
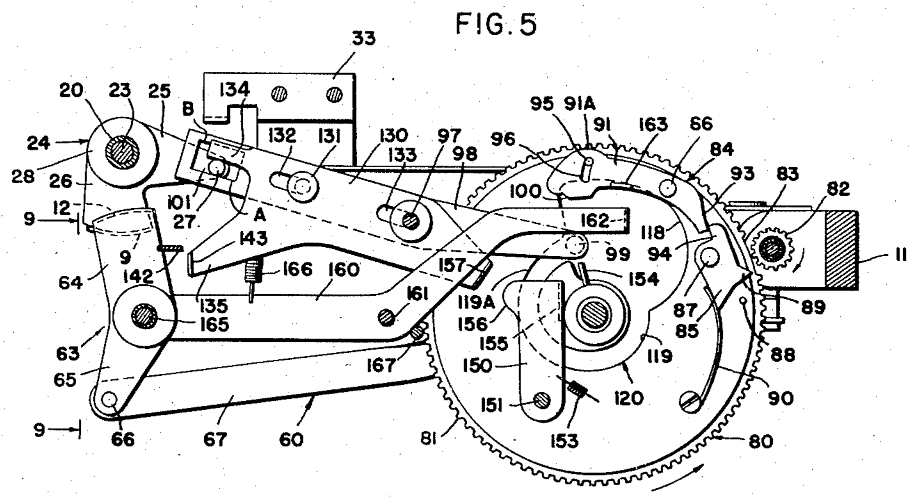
Fig. 5 is a sectional view taken on line 5—5 of Fig. 2, showing the change-cycle control mechanism.

When the control mechanism 60 is set to the "automatic" position, and the tone arm is tracking a record, there is arranged a locking mechanism for preventing the records supported on the spindle 39 from dropping accidentally on the tone arm should the operator through inadvertence move the control knob 61 to the "manual" position to remove the already played records. Referring to Figs. 4 and 5, there is shown formed on the arm 26 of the tone arm bell crank 24, an upturned ear 9 and on the arm 64 of the bell crank 63 a cooperating downwardly extending ear 12. In operation, when the tone arm is tracking a record, the bell crank levers 24 and 63 assume the position shown in Fig. 5. It is seen that the control knob 61 is locked against movement by the downwardly extending ear 12 engaging the inner wall of the upturned ear 9 on arm 26. However, when the tone arm is manually swung beyond the edge of the turntable, the ear 9 of the arm 26 is moved therewith in a counterclockwise direction out of the path of movement of the ear 12 on the arm 64 whereupon the control knob 61 can be moved to the "manual" position to cause the sleeve 40 to assume its non-record supporting position.

For automatically swinging the tone arm outwardly from the turntable and automatically releasing records from the spindle 39, there is provided a change-cycle control mechanism 80 (Fig. 5). The control mechanism comprises a unitary cam gear 81 which is adapted to mesh with and be driven by a drive means comprising pinion gear 82 formed in the lower end of the turntable shaft 10. The unitary cam gear has breached portion 83 the function of which is to break the driving connection with the pinion gear 82 after one complete revolution of the cam gear. One complete revolution of the cam gear defines one complete record change-cycle operation.

Arranged on the upper surface of the cam gear 81 is a change-cycle initiating mechanism 84 operatively connected and responsive to the abnormal movement of the tone arm when it enters the tripping groove of a record. The mechanism 84 comprises a pawl member 85 pivotally mounted on cam gear 81 by the pin 87 and having a projection 89 which is adapted to engage the rotating pinion 82 under the biasing action of a leaf spring 90. When the projection 89 engages the pinion 82, the pawl 85 is pivoted in a counterclockwise direction into engagement with the stop 88 whereupon the cam gear 80 is moved in a counterclockwise direction to mesh with the pinion 82 and be driven through one complete revolution coming to rest again at the breached portion 83. Cooperating with the pawl 85 is a tripping lever 91 pivoted on cam gear 80 by the pin 86, and having an extension 93 which is arranged to abut the outer extremity of a finger 94 on the pawl 85 and hold it against counterclockwise rotation. For limiting the movement of lever 91 there is provided a pin 95 in gear 80 which projects into slot 96 cut in lever 91.

For tripping the lever 91 there is pivotally mounted on a stud 97 secured to the base plate, a lever 98 having affixed at one end thereof a downwardly extending pin 99 which is arranged to engage the tripping lever 91 as at 100 and pivot it in a clockwise direction whereby its extension 93 moves out of abutment with finger 94 of pawl 85 and releases the pawl 85 into engagement with the pinion 82. At the opposite end of the lever 98 there is provided a rectangular aperture 101 in which is disposed for movement the pin 27 connected to the tone arm bell crank 24. In operation, as the tone arm is normally tracking a record, the pin 27 moves therewith in a clockwise direction thereby engaging the wall portion A of the aperture 101 to pivot the lever 98 in a counterclockwise direction. The pin 99 on the lever 98 approaches the surface 100 of lever 91. When the tone arm enters the tripping groove of the record, the pin 99 is moved an abnormal distance whereupon it engages the lever 91 as at 100 to pivot it and release the pawl 85 for engagement with the rotating pinion 82 to start the record change-cycle operation.

For resetting the pawl 85 for a subsequent operation, there is formed on the lever 91 a cam surface 91A which, during the rotation of the cam gear, engages the pinion 82 and pivots the lever 91 in a counterclockwise direction until pin 95 engages the wall of slot 96. As the lever 91 is pivoted in a counterclockwise direction, the extension 93 thereof engages the finger 94 on the pawl 85 and pivots it in a clockwise direction until extension 93 and finger 94 abut one another as shown in Fig. 5 whereupon the pawl 85 is reset for a repeating tripping operation.

For operating the tone arm raising and lowering mechanism and the record-holding and releasing means, there is provided (Figs. 4 and 8) a series of concentric cam surfaces 105, 106 and 107 mounted on the underside of the cam gear 81. Cooperating with the cam 105, there is provided the tone arm lifting and lowering lever 30 having a toe portion 110. The toe 110 normally engages the low portion 111 of cam surface 105. Upon rotation of the cam gear, in a counterclockwise direction (Fig. 3), the high portion 112 of cam 105 engages toe 110 and pivots the lever 30 in a counterclockwise direction (Fig. 3) whereby adjustable screw 31 engages the tone arm-elevating pin 23 to lift the tone arm away from the record. When the low cam surface 111 again engages the toe 110, the lever 30 is pivoted in a clockwise direction whereupon the tone arm is lowered onto the record on the turntable.

For operating the resilient record-supporting means 51 so that the lowermost record in the stack can be released by the sleeve 40, there is connected to the lever 48 a roller 115 which is arranged to track the cam surface 107. Normally the roller 115 engages the low portion 109 of cam surface 107 and as the cam gear rotates in a clockwise direction, the high portion 108 of cam 107 engages and pivots the lever 48 in a clockwise direction (Fig. 3) whereupon the control rod 46 connected thereto is urged downwardly thereby causing the collar 51 to expand and support all but the lowermost record in the stack above the turntable during the record change-cycle operation. After the lowermost record is released by the sleeve 40 the high portion 108 of cam surface 107 engages the roller 115 and the lever 48 is pivoted in a counterclockwise direction whereupon the contraction of the collar 51 releases the supported records to be again supported by the sleeve 40. The contraction of the collar 51 causes control rod 46 to assume its normal position as shown in Fig. 6.

While the records are being supported by the collar 51, one end of the lever 72 is normally disposed on the high portion 116 of cam surface 106. As the cam gear rotates in a clockwise direction, the low portion 117 of cam surface 106 causes the lever 72 to pivot in a counterclockwise direction (Fig. 3) about the high cam surface 78 on the shaft 71. When the lever 72 is pivoted, the sleeve 40 is caused to move downwardly by the biasing action of the spring 74A. As a result, the lowermost record supported by the sleeve 40 is released to drop onto the turntable. When the high portion 116 of cam surface 106 again engages the lever 72, it is pivoted clockwise and the sleeve 40 is moved upwardly to support records during the normal reproduction cycle.

For swinging the tone arm away from the turntable during a record changing cycle and returning it over the starting groove of a record for a reproduction cycle, there is formed on the upper surface of the cam gear 80, a cam track 120 adapted to cooperate with the lever 98. When the lever 98 has tripped the lever 91 in a manner already described, to start the change-cycle operation, there is arranged on the cam track 120 a cam surface 118 which engages the pin 99 in lever 98 and causes the lever 98 to pivot in a clockwise direction (Fig. 5). As a result, the wall portion A in the aperture 101 on the opposite end of the lever 98 engages the pin 27 of the tone arm crank 24 to pivot it and the tone arm in a counterclockwise direction away from the turntable.

Formed on the cam track 120 is another cam surface 119 which is so arranged to temporarily hold the tone arm away from the turntable during the record holding and releasing operation of the spindle 39. For returning the tone arm over the starting groove of a record, there is also arranged the cam surface 119A which causes the lever 98 to pivot in a counterclockwise direction whereupon the wall B of the aperture 101 engages the pin 27 to swing the tone arm in a clockwise direction to return the tone arm over the starting groove of a large or, for example, a twelve-inch record.

Associated with the tone arm lever 98 there is provided a mechanism for the returning of the tone arm over the starting groove of a small or, for example, a ten-inch record. This mechanism comprises a lever 130 pivoted about the stud 97 and slidably mounted on the lever 98 and movable therewith. The lever 130 is slidably affixed to the lever 98 by means of pin 131 fixed to lever 98. The elongated apertures 132 and 133 determine the lateral movement of the lever 130. At one end of the lever 130, there is arranged a projection 134 and an arm 135. The projection 134 is adapted upon movement of the lever 130 to the left to be positioned into the path of movement of the pin 27 to cause the tone arm to be moved a greater distance inwardly than previously when the wall B engaged the pin 27 to position the tone arm over a twelve-inch record. Thus, the tone arm may be lowered to the playing groove of a small or ten-inch record.

For positioning the projection 134 adjacent the pin 27 so that the tone arm will be lowered over a ten-inch record, there is provided a lever 150 (Fig. 5) pivoted at one end on a pin 151 depending from the base plate. The lever 150 is biased toward the hub of the cam gear 80 by a spring 153 secured to the base plate in any suitable fashion. Secured to the hub of the cam gear is a pin 154 which is arranged to engage a downturned ear 155 on the lever 150 and pivot it in a counterclockwise direction during each rotation of the cam gear. It is to be noted that pin 154 operates lever 150 as the tone arm is moved outwardly and before a record is released. When the lever 150 is pivoted, a cam surface 156 formed at the free end of the lever 150 engages a downturned ear 157 on the lever 130, and as a result the lever 130 is moved to the left to move the projection 134 into a position adjacent the pin 27, as clearly shown in Fig. 5. In operation, as the lever 98 starts to return the tone arm over the turntable, the projection 134 instead of the wall B engages the pin 27 and returns the tone arm over the starting groove of a ten-inch record. The lever 130 is moved to the left simultaneously with the raising of the tone arm.

Figure 2:
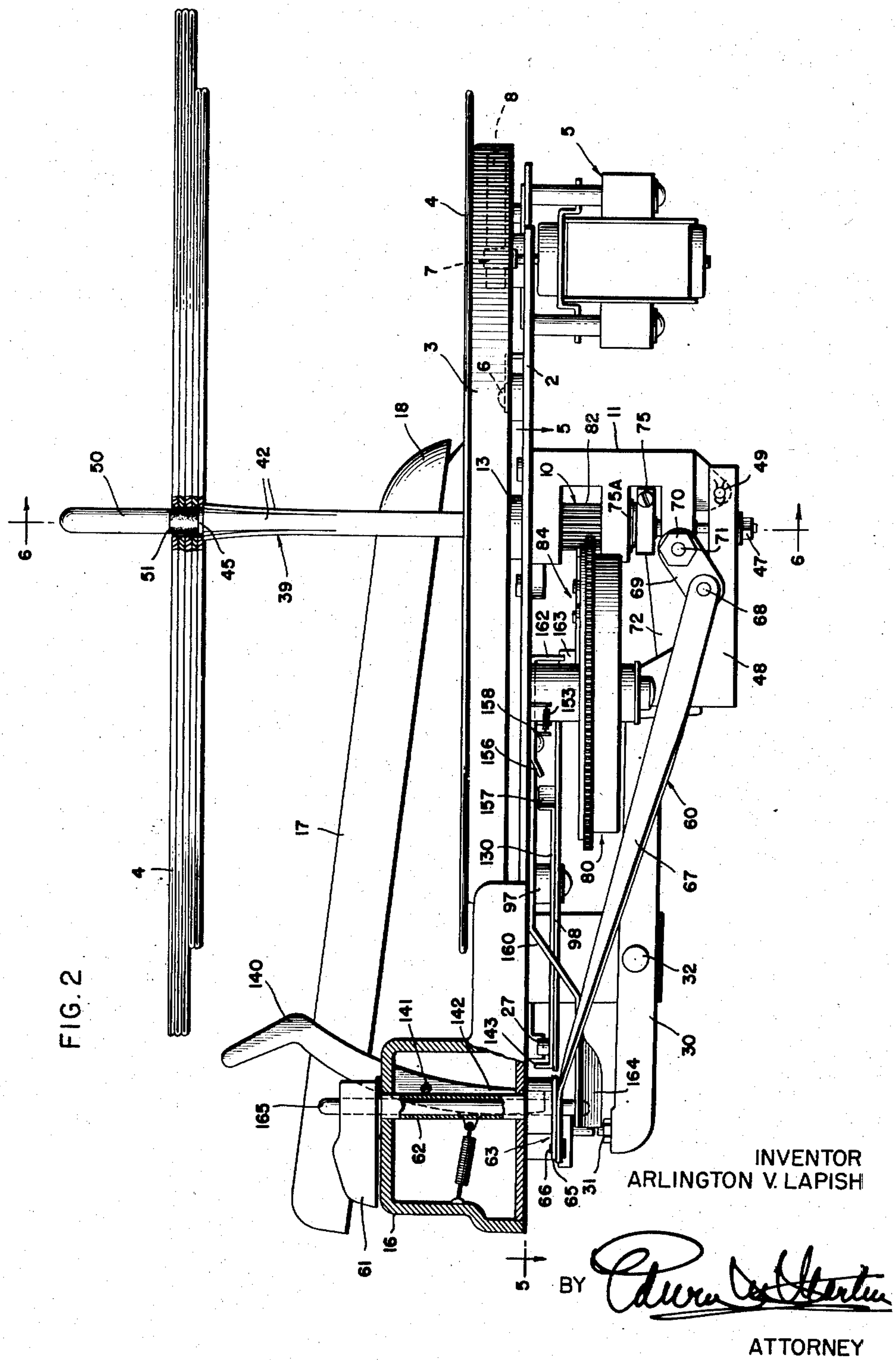
Fig. 2 is a front elevational view of a record-changing apparatus as viewed on line 2—2 of Fig. 1.
Figures 3, 8:
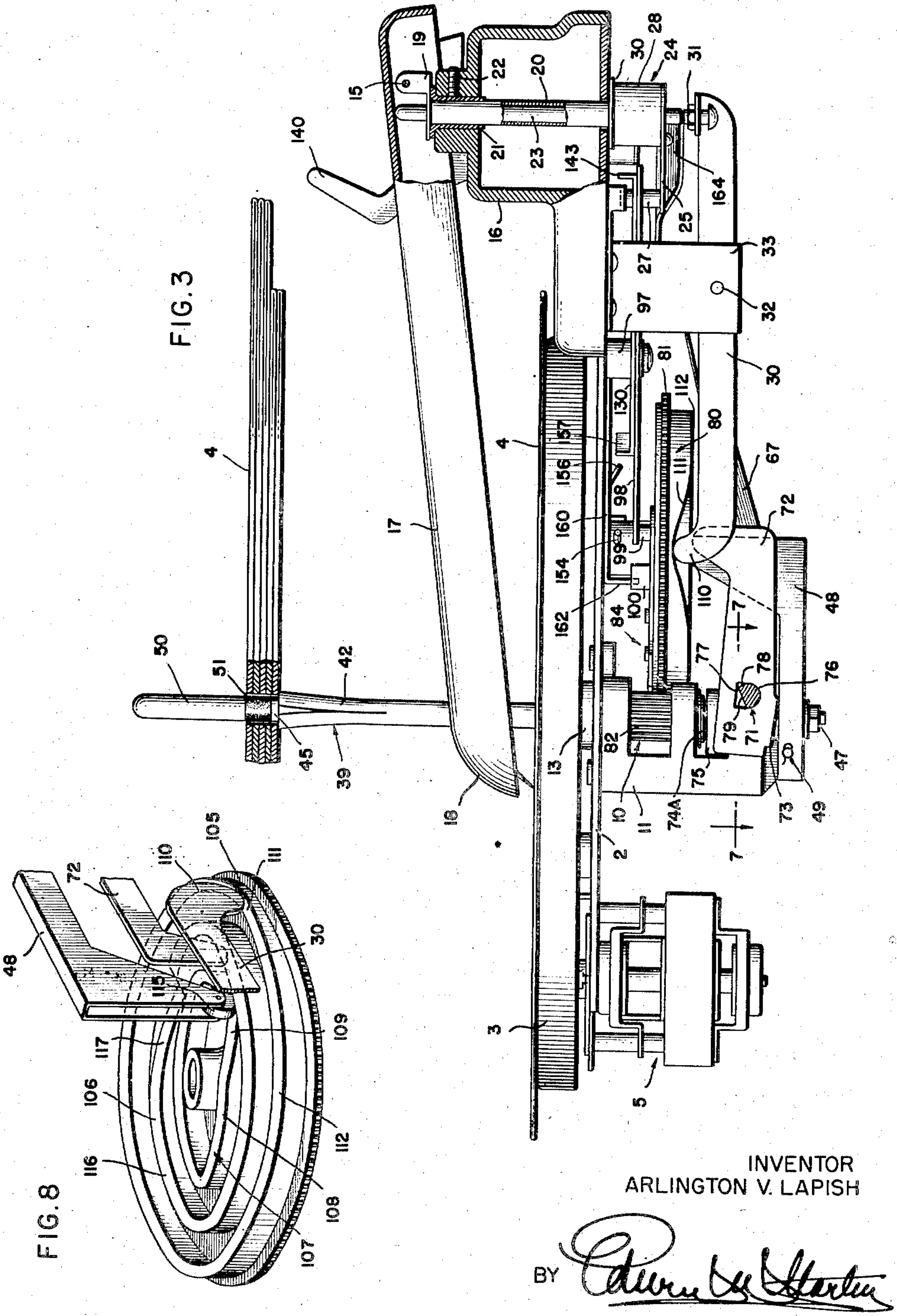
Fig. 3 is a rear elevational view of the apparatus as viewed on line 3—3 of Fig. 1.
Fig. 8 is a fragmentary perspective view of the underside of the master cam gear which controls the operation of the record-changing mechanism.

For actuating the lever 130 so that the tone arm may be placed over the starting groove of a twelve-inch record by the lever 98, there is provided a substantially vertical spring biased indexing finger 140 pivoted as at 141 in the standard 16 (Figs. 1 and 2). The upper end of the indexing finger 140 is adapted to be engaged by a falling twelve-inch record whereby to pivot the lower end 142 of arm 140 (Figs. 2 and 5) into engagement with the upturned ear 143 on arm 135 of the lever 130. The arm 135 is positioned in the path of movement of the lever 140 when the tone arm is being swung outwardly toward the edge of the turntable and before a record is released. When a twelve-inch record is released from the spindle 39, the lever 140 is pivoted in a counterclockwise direction (Fig. 2) whereupon the lower end 142 thereof engages the ear 143 to move the lever 130 to the right (Fig. 5). The projection 134, connected to lever 130, is moved away from the path of movement of the pin 27 to allow the wall B of the aperture 101 to engage the pin 27 and return the tone arm over the starting groove of a twelve-inch record.

Reject means are provided for initiating a change-cycle operation prior to the completion of the reproduction of a record. This means comprises a lever 160 (Fig. 5) pivoted intermediate its ends on a pin 161 depending from the base plate. At one end of the lever there is provided a downturned ear 162 which is adapted to engage an upturned ear 163 formed on the tripping lever 91. The opposite end of the lever 160 is provided with a cam surface 164 (Fig. 4) which is arranged to be engaged by the lower end of a control rod 165 journaled in the sleeve 62 (Fig. 2). When the rod 165 is depressed, the lever 160 is caused to be pivoted in a counterclockwise direction whereupon the ear 162 engages the lever 91 to pivot it out of tripping engagement with the pawl 85 to start a record change-cycle operation. A spring 166 connected between the lever 160 and the bracket 33 returns the lever to its normal position against the stop 167.

The operation of the record-changing apparatus will now be described. First, the control knob 61 is moved to the "automatic" position on the scale 59, whereupon the shaft 71, operatively connected thereto by lever 67, is rotated in a counterclockwise direction (Fig. 3). As the shaft 71 is rotated the high cam surface 78 thereof engages the flat wall of the aperture 77 to lift the lever 72. As the lever 72 is lifted, the ear 73 thereof (Fig. 6) engages the pin 74 to move it upwardly to engage the collar 75 and move the sleeve 40 in an upward direction against the biasing action of the spring 74A. As the sleeve 40 is moved upwardly, the tri-parted portion 42 thereof is caused to engage the shoulder 45 and flare outwardly to form a seat so that a stack of large or small records 4 may be placed thereon. It is to be noted that a stack of intermixed large and small records may be placed on the spindle.

After the stack of records is placed on the sleeve 40 the tone arm is positioned over the starting groove of a record on the turntable.

During the reproduction of the record the tone arm moves gradually inwardly, moving therewith the pin 27 in a clockwise direction (Fig. 5) which in turn pivots the lever 98 in a counterclockwise direction. Upon entering the tripping groove of the record, the tone arm is suddenly swung inwardly whereupon the pin 99 connected to the lever 98 engages the lever 91 as at 100 to pivot it in a clockwise direction. As the lever 91 is pivoted, its extension 93 releases the pawl 85 from its tripping engagement therewith and under the biasing action of the spring 90 is caused to pivot in a counterclockwise direction whereby its projection 89 engages the continuously rotating pinion 82. When the projection 89 engages the pinion 82, the unitary cam gear 81 is moved in a counterclockwise direction to mesh with pinion 82 to start the change-cycle operation.

As the cam gear rotates, the high portion 112 of cam 105 (Fig. 3) engages the toe 110 on the tone arm lifting and lowering lever 30 to pivot it in a counterclockwise direction whereupon the opposite end thereof engages and raises the pin 23 to lift the tone arm away from the record.

As the tone arm is being raised, the pin 154 (Fig. 5) connected to the hub of the cam gear engages the downturned ear 155 on the lever 150 to pivot it in a counterclockwise direction whereby its cam surface 156 engages the upturned ear 157 on the lever 130 and pushes it to the left so that its projection 134 will be positioned in the path of the pin 27 normally to return the tone arm over the starting groove of a ten-inch record. During each change-cycle operation, the lever 150 is pivoted by the pin 154. However, lever 150 does not engage the lever 130 unless lever 130 is previously moved to its extreme right position by the actuation of the indexing finger 140 in response to the previously dropping of a twelve-inch record as will be explained subsequently.

With the raising of the tone arm, the high portion 108 of cam 107 engages the roller 115 on the lever 48 and pivots it in a clockwise direction (Figs. 3 and 4) whereupon the control rod 46, operatively connected thereto, is urged downwardly thereby causing the resilient collar 51 to expand and support all but the lowermost record in the stack. The lowermost record is freely disposed about the shoulder 45 and supported by the tri-parted portion 42 on the sleeve 40.

Continued rotation of the cam gear 81 causes the surface 118 of cam 120 to engage the pin 99 on the lever 98 to pivot it in a clockwise direction (Fig. 5). As the lever 98 is pivoted, the wall A of the aperture 101 engages the pin 27 to swing the tone arm in a counterclockwise direction beyond the edge of the turntable.

While the records are being supported by the collar 51, the cam surface 119 of cam 120 engages the pin 99 to hold the tone arm beyond the edge of the turntable.

As the tone arm is being held away from the turntable, the cam gear continues to rotate whereby its low portion 117 of cam 106 engages the lever 72 to pivot it in a counterclockwise direction (Figs. 3 and 4). When the lever 72 is pivoted, the ear 73 is lowered to actuate pin 74 and allow the sleeve 40 to move downwardly under the influence of the spring 74A. Since the lowermost record in the stack is freely disposed about the shoulder 45, the downward movement of the sleeve 40 causes the tri-parted sections 42 to leave the shoulder 45 and converge whereupon the lowermost record is allowed to fall onto the turntable while the remaining records in the stack are held by the collar 51.

Continued rotation of the cam gear causes the high portion 116 of cam 106 to engage and pivot the lever 72 in a clockwise direction (Figs. 3 and 4) whereupon the ear 73 thereof actuates the pin 74 upwardly to engage the collar 75 and raise the upper portions 42 of the sleeve 40 into engagement with the shoulder 45. The tri-parted portions 42 are caused to expand again to form a seat for the stack of records held by the collar 51.

Further rotation of the cam gear causes the portion 119A of cam surface 120 to engage the pin 99 to pivot the lever 98 in a counterclockwise direction. As the lever 98 is pivoted, the projection 134 engages the pin 27 to swing the tone arm inwardly over the starting groove of a ten-inch record. When the tone arm is positioned over the record, the low portion 111 of cam 105 at this time engages the lever 30 to pivot it in a clockwise direction (Fig. 3) to lower the tone arm onto the record.

With the lowering of the tone arm, the low portion 109 of cam 107 engages the lever 48 to pivot it in a counterclockwise direction (Figs. 3 and 4) whereupon the rod 46 is released to move upwardly under the influence of the collar 51. As the collar 51 contracts the records held thereby are released to rest on the tri-parted portion 42 of the sleeve 40.

As the tone arm is being lowered, the cam surface 91A on the lever 91 at this time engages the pinion 82 to pivot lever 91 in a counterclockwise direction (Fig. 5). As the lever 91 is pivoted, the projection 93 thereof engages the finger 94 on the pawl 85 to pivot it in a clockwise direction and reset it for the next change-cycle operation.

After the pawl 85 is reset the cam gear continues to rotate until the breached portion 83 is opposite the pinion 82, whereupon the driving connection therewith is broken thereby completing the record change-cycle operation.

In the event that a twelve-inch record is dropped from the spindle 39, the record, in dropping, engages the lever 140 (Figs. 2 and 5) to pivot it in a counterclockwise direction whereupon the lower end 152 thereof engages the ear 143 on the arm 135 of lever 130 to move it to the right thereby moving the projection 134 out of the path of the pin 27 to allow the wall portion B of the aperture 101 to engage the pin 27 and swing the tone arm over the starting groove of a twelve-inch record. This occurs after pin 154 has initiated the movement of lever 130 to the left (Fig. 5).

If it is desired to reject a record, the rod 165 is depressed. As the rod is depressed, the lower end thereof engages the cam surface 164 on the lever 170 to pivot it in a counterclockwise direction. As the lever 160 is pivoted, the opposite end thereof engages the tripping lever 91 as at 163, thereby releasing the pawl 85 for engagement with the continuous rotating pinion 82.

If it is desired to play the phonograph apparatus manually, the control knob 61 is moved over the scale 59 to the "manual" position where upon the shaft 71 operatively connected thereto is rotated in a clockwise direction (Fig. 3). When the shaft is rotated the low cam surface 79 thereof assumes a horizontal position whereupon the lever 72 is caused to drop to a non-operative position due to the flattened configuration of the aperture 77. When the lever 72 drops, the spring 74A moves the sleeve 40 downwardly thereby causing the tri-parted portion 42 to contract to permit the placement and removal of records on the turntable. When the lever 72 has dropped, the pin 74 drops away from the collar 75 connected to the sleeve 40 so that the collar 75 cannot actuate the sleeve 40.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An automatic phonograph comprising a turntable, a tone arm pivoted adjacent said turntable for vertical and horizontal movement, a record centering spindle operatively associated with said turntable and comprising a record supporting portion spaced above said turntable for supporting a stack of records and a movable record releasing portion adjacent said record supporting portion, cam means for effecting a record changing cycle, a linkage connecting said cam means and said record supporting portion for separating the lowermost supported record during a record changing cycle and supporting the remainder of the stack of records during a record changing cycle, a linkage connecting said cam means and said record releasing portion comprising a movable member, a lever operatively associated with said movable member and said cam means for releasing said lowermost record after it is separated from said stack of records, a pivot shaft arranged to provide an eccentric pivot point for said lever and manually operable mechanism operatively associated with said pivot shaft for rotating said pivot shaft for lowering said lever whereby said lever may be disconnected from said movable member and said cam means for permitting manual operation of the phonograph.

2. An automatic phonograph comprising a turntable, a tone arm pivoted adjacent said turntable for vertical and horizontal movement, a record centering spindle operatively associated with said turntable and comprising a record supporting portion spaced above said turntable for supporting a stack of records and a vertically movable record releasing portion adjacent said record supporting portion, cam means for effecting a record changing cycle, a linkage connecting said cam means and said record supporting portion for separating the lowermost supported record during a record changing cycle and supporting the remainder of the stack of records during a record changing cycle, a linkage connecting said cam means and said record releasing portion comprising a vertically movable member, a lever operatively associated with said vertically movable member and said cam means for releasing said lowermost record after it is separated from said stack of records, said lever having an aperture with a flattened wall, a pivot shaft extending through said aperture and having a flattened portion normally disposed adjacent the flattened wall of said aperture and manually operable mechanism operatively associated with said pivot shaft for rotating said pivot shaft for changing the point of engagement between the flattened portion of said shaft and the flattened wall of said aperture and lowering said lever whereby said lever may be disconnected from said vertically movable member and said cam means for permitting manual operation of the phonograph.

3. An automatic phonograph comprising a turntable, a tone arm pivoted adjacent said turntable for vertical and horizontal movement, a record centering spindle operatively associated with said turntable and comprising an enlargeable record supporting portion spaced above said turntable for supporting a stack of records and a vertically movable record releasing portion adjacent said enlargeable portion, cam means for effecting a record changing cycle, a linkage connecting said cam means and said record supporting portion for separating the lowermost supported record during a record changing cycle and supporting the remainder of the stack of records during a record changing cycle, a linkage connecting said cam means and said record releasing portion comprising a vertically movable member, a lever operatively associated with said vertically movable member and said cam means for releasing said lowermost record after it is separated from said stack of records, said lever having a substantially circular aperture with a flattened wall, a pivot shaft extending through said circular aperture and having a flattened portion normally disposed adjacent the flattened wall of said aperture and manually operable mechanism connected to said pivot shaft for rotating said pivot shaft for changing the point of engagement between the flattened portion of said shaft and the flattened wall of said aperture and lowering said lever whereby said lever may be disconnected from said vertically movable member and said cam means for permitting manual operation of the phonograph.

ARLINGTON VICTOR LAPISH.

REFERENCES CITED

The following references are of record in the file of this patent:

UNITED STATES PATENTS

| Number | Name | Date |
|---|---|---|
| 2,017,898 | Gates | Oct. 22, 1935 |
| 2,230,106 | Erwood | Jan. 28, 1941 |
| 2,237,340 | Downs | Apr. 8, 1941 |
| 2,287,098 | Habegger | June 23, 1942 |
| 2,339,981 | Cranmer et al. | Jan. 25, 1944 |
| 2,368,086 | Becwar | Jan. 30, 1945 |

FOREIGN PATENTS

| Number | Country | Date |
|---|---|---|
| 55,603 | Netherlands | Oct. 16, 1943 |
| 62,822 | Denmark | Oct. 23, 1944 |
| 67,631 | Norway | Mar. 27, 1944 |
| 822,026 | France | Sept. 6, 1937 |